US007963647B2

(12) United States Patent
Nakata et al.

(10) Patent No.: US 7,963,647 B2
(45) Date of Patent: Jun. 21, 2011

(54) LIGHT IRRADIATION APPARATUS AND INJET PRINTER

(75) Inventors: Shigenori Nakata, Yokohama (JP); Masahito Namai, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 989 days.

(21) Appl. No.: 11/738,160

(22) Filed: Apr. 20, 2007

(65) Prior Publication Data

US 2007/0247506 A1 Oct. 25, 2007

(30) Foreign Application Priority Data

Apr. 25, 2006 (JP) ................................ 2006-120424

(51) Int. Cl.
*B41J 2/01* (2006.01)
*G02B 5/10* (2006.01)

(52) U.S. Cl. ........................................ 347/102; 359/867

(58) Field of Classification Search .................. 347/102; 359/867

See application file for complete search history.

(56) References Cited

U.S. PATENT DOCUMENTS

| | | | | |
|---|---|---|---|---|
| 4,177,383 A | 12/1979 | Knight | |
| 4,452,528 A * | 6/1984 | Rath | 355/51 |
| 4,484,334 A * | 11/1984 | Pressley | 372/101 |
| 4,505,551 A * | 3/1985 | Jacobs | 359/232 |
| 4,657,397 A * | 4/1987 | Oehler et al. | 356/414 |
| 4,764,776 A * | 8/1988 | Mugrauer et al. | 347/232 |
| 5,526,190 A * | 6/1996 | Hubble et al. | 359/719 |
| 5,620,478 A * | 4/1997 | Eckhouse | 607/88 |
| 5,673,102 A * | 9/1997 | Suzuki et al. | 355/53 |
| 5,745,176 A * | 4/1998 | Lebens | 348/370 |
| 5,864,388 A * | 1/1999 | Shima et al. | 355/53 |
| 5,889,571 A * | 3/1999 | Kim et al. | 349/124 |
| 6,206,527 B1 * | 3/2001 | Suzuki | 359/858 |
| 6,238,066 B1 * | 5/2001 | Iwasaki | 362/347 |

(Continued)

FOREIGN PATENT DOCUMENTS

JP 2005-103852 A 4/2005

(Continued)

OTHER PUBLICATIONS

Current Status on Injet Printing by UV Curing Technology; Hiromichi Noguchi and Teruo Orikasa; Canon Inc., 213-0006, 3-16-1; Fusion UV Systems Japan KK, 104-0033, 1-9-3, pp. 32-46.

(Continued)

*Primary Examiner* — Charlie Peng
(74) *Attorney, Agent, or Firm* — Roberts Mlotkowski Safran & Cole, P.C.; David S. Safran

(57) ABSTRACT

A light irradiation apparatus in which high peak irradiance is obtained and the heat influence on the article being irradiated with light is reduced, and also an inkjet printer which has such a light irradiation apparatus in which pictures with high image quality can be reliably made and the amount of heat influence on the recording medium is low is achieved using a light irradiation apparatus having a discharge lamp of the short arc type and a reflection component for reflecting the light of this discharge lamp. The light of the discharge lamp is radiated in a state in which it is focused by the reflection component so as to extending linearly on the light irradiation area. The inkjet printer has a head part with the above described light irradiation apparatus, the light from which sets ink of the photosetting type which has been applied to the recording medium 12 Claims, 5 Drawing Sheets

U.S. PATENT DOCUMENTS

| | | | | |
|---|---|---|---|---|
| 6,248,804 | B1 | 6/2001 | Lutz | |
| 6,305,796 | B1 * | 10/2001 | Szlucha et al. | 347/102 |
| 6,543,890 | B1 * | 4/2003 | Ylitalo et al. | 347/102 |
| 6,739,716 | B2 * | 5/2004 | Richards | 347/102 |
| 6,771,353 | B2 * | 8/2004 | Sato | 355/69 |
| 6,783,227 | B2 * | 8/2004 | Suzuki et al. | 347/102 |
| 6,964,487 | B2 * | 11/2005 | Olsen et al. | 359/869 |
| 7,137,695 | B2 * | 11/2006 | Yokoyama | 347/102 |
| 7,891,824 | B2 * | 2/2011 | Huang | 353/99 |
| 2002/0021091 | A1 * | 2/2002 | Higashimoto et al. | 313/623 |
| 2002/0034025 | A1 * | 3/2002 | Carter | 359/867 |
| 2002/0101491 | A1 * | 8/2002 | Ervin et al. | 347/102 |
| 2003/0209986 | A1 * | 11/2003 | Ishigami et al. | 313/641 |
| 2004/0241578 | A1 * | 12/2004 | Hirai | 430/270.1 |
| 2005/0007023 | A1 * | 1/2005 | Arimoto et al. | 313/642 |
| 2005/0068397 | A1 * | 3/2005 | Yokoyama | 347/102 |
| 2005/0168509 | A1 | 8/2005 | Yokoyama | |
| 2006/0050122 | A1 * | 3/2006 | Nakano et al. | 347/102 |
| 2008/0049088 | A1 * | 2/2008 | Codos | 347/102 |

FOREIGN PATENT DOCUMENTS

| | | | |
|---|---|---|---|
| JP | 2005-305742 | A | 11/2005 |
| WO | 2005/039883 | A1 | 5/2005 |

OTHER PUBLICATIONS

Compact UV Irradiation System for Injet Printer, Yutaka Hasegawa et al., Technical Report, 2004 GS Yuasa Corporation, pp. 78-82, English Abstract.

* cited by examiner

LIGHT IRRADIATION APPARATUS AND INJET PRINTER

BACKGROUND OF THE INVENTION

1. Field of the Invention

The invention relates to a light irradiation apparatus and an inkjet printer. The invention relates especially to a light irradiation apparatus which forms a line-like, narrow light irradiation region on the article to be irradiated with light, and irradiates it with light, and to an inkjet printer in which such a light irradiation apparatus is installed and with which images are recorded on a recording medium.

2. Description of the Prior Art

Currently, for example, an inkjet recording method is used for various printing tasks such as reprinting, for example, photography printing, marking color filters and the like, because pictures can be made by an engraved printing method easily, and moreover, at low cost.

In an inkjet printer using such an inkjet recording method, pictures with high image quality can be produced by a write head which regulates and delivers fine dots which are suitably combined with ink by color reproduction process, in which permanency, output suitability and the like have been improved, and with special paper with ink absorption properties, color material-color generation properties, surface shine and the like which have been suddenly improved.

Generally, inkjet printers can be classified based on the types of ink used. For example, an inkjet printer of the photosetting type is known in which ink of the photosetting type is used which is set by light irradiation, such as UV radiation or the like. (See, for example, Japanese Patent Application Publication JP-A 2005-246955 (corresponding to U.S. Patent Application Publication 2005/168509 A1); Japanese Patent Application Publication JP-A 2005-103852; Japanese Patent Application Publication JP-A 2005-305742; and the publication "Trends in UV inkjet printing", Hiromichi Noguchi, Teruo Orikasa, Journal of the Japanese Society of Printing Science, 2003, Volume 40, no. 3, pp. 32 to 46.)

The inkjet method of the photosetting type has the advantages of a relatively minor smell and usability, besides for special paper, also for a recording medium which dries quickly and does not have absorption properties.

One type of inkjet printer using such an inkjet method of the photosetting type is shown in FIG. 13 and has:

- a write head 71 which is provided with a nozzle (not shown) which, for example, applies ink of the UV radiation setting type to the recording medium R as extremely small droplets, and
- a head part 70 in which two light irradiation apparatus 80A, 80B are installed in a carriage 72, and which are located, for example, on opposite sides of the writing head 71 for setting the ink which has been applied to the recording medium R with UV radiation.

The head part 70 is supported by a rod-like guide rail 75 which extends along the recording medium R and is moved back and forth by a drive device which is not shown in the drawings along the guide rail 75 above the recording medium R.

The inks of the UV radiation setting type to be used can be, for example, the following and similar ones:

- ink based on radical polymerization which contains a radically polymerizable compound as a polymerizable compound; and
- ink based on cationic polymerization which contains a cationically polymerizable compound as a polymerizable compound.

In this connection, the ink based on radical polymerization plays the main role.

The light irradiation apparatus 80A, 80B, each have a box-shaped cover component 81 with a light exit opening 81A which is open in the direction in which the recording medium R is located (in FIG. 13 toward the bottom). In this cover component 81, a discharge lamp 82 of the long arc type which forms a linear light source is arranged such that it extends parallel to the recording medium R in the direction which orthogonally intersects the direction of motion of the head part 70. With respect to the light exit opening 81A, behind the discharge lamp 82 there is a bucket-like reflector 83 with a reflection surface 83A in the form of an ellipsoid which extends along the discharge lamp 82 and reflects the light from the discharge lamp 82, the discharge lamp 82 being arranged at the first focal point Fr1 of the reflection surface 83A. The discharge lamp 82 is, for example, a high pressure mercury lamp or a metal halide lamp, the length of the light emitting part having a size with which a light irradiation region IA is formed which, for example, is larger than the dimensions (width dimension) of the recording medium R in the direction of motion of the head part 70.

In the above described inkjet printer, the head part 70 is arranged such that the recording medium R is positioned at a second focal point Fr2 of the reflector 83 for the light irradiation apparatus 80A, 80B or in the vicinity of the second focal point Fr2. By moving the head part 70 above the recording medium R, for example, in the state in which the discharge lamp 82 remains in operation, the light from the discharge lamp 82 is emitted and linearly focused on the recording medium R which is positioned at the second focal point Fr2 of the reflector 83. In this way, the ink of the UV radiation setting type is set directly after it has been applied to the recording medium R.

The following is a specific description of the setting treatment of the ink of the UV radiation setting type (irradiation treatment of the ink of the UV radiation setting type with UV radiation).

In FIG. 13, the ink of the UV radiation setting type which has been applied to the recording medium R is set by the radiant light of one of the light irradiation apparatus, specifically the light irradiation apparatus 80A, which is positioned downstream of the direction of motion of the head part 70 when printing takes place in the recording medium R by the head part 70 being moved to the right, for example. On the other hand, the ink of the UV radiation setting type applied to the recording medium R is set by the radiant light of the other light irradiation apparatus 80B which is positioned downstream of the direction of motion of the head part 70 when printing takes place in the recording medium R by the head part 70 being moved to the left in FIG. 13.

Recently there have been the corresponding demands for raising the picture quality obtained from an inkjet printer using the above described inkjet recording method of the photosetting type and a demand for faster setting treatment of the ink. The reason for this is the following.

As is shown in Japanese Patent Application Publication JP-A 2005-246955 corresponding to U.S. Patent Application Publication 2005/168509 A1 described above, for example, ink based on radical polymerization has the property that the presence of oxygen reduces the concentration of radicals. The longer the ink is exposed to the atmosphere, the lower the rate of setting and the greater the time consumption for ink setting. The ink used in an inkjet printer must have a somewhat low viscosity so that it is easily discharged from the nozzle of the write head. When the ink has not immediately set (photopolymerized) after application of the ink to the recording medium, due to the frequent changes of the dot form of the applied ink, a picture with high image quality can no longer be obtained.

Based on this requirement, it can be considered that, for example, by increasing the peak irradiance of the light emitted by the light irradiation apparatus, the polymerization reaction will be accelerated.

In the above described publication "Trends in UV inkjet printing", it is shown that, for example, by using a microwave lamp with high irradiance, the amount of reduction of the rate of ink setting by oxygen can be reduced, i.e., that a reduction of image quality can be prevented by rapid execution of the ink setting treatment. For example, an equally large light irradiation region can be formed such as by a discharge lamp of the long arc type. Furthermore, the utility of a microwave UV lamp is shown in which still higher irradiance is obtained than in a discharge lamp of the long arc type. The peak irradiance of the microwave UV lamp which is described in publication "Trends in UV inkjet printing" is, for example, roughly 1000 $mW/cm^2$ to 1200 $mW/cm^2$.

In the Japanese Patent Application Publication JP-A 2005-103852, a technique is described in which there is a cylindrical lens between a light source lamp and a recording medium which focuses light from the light source lamp and irradiates the recording medium with it, and in which, thus, the peak irradiance of the light emitted onto the recording medium is increased.

Even if using optical elements, such as lenses, mirrors and the like, the light from the light source lamp is focused and thus irradiated, there is a limit to the magnitude of the peak irradiance that can be obtained since the radiance of the light source lamp, itself, has not been increased.

The same applies to the case of using a microwave UV lamp. In order to obtain irradiance which is relatively high relative to the degree to which the above described requirement can be met, it is necessary to increase the radiance of the microwave UV lamp in itself. However, in reality, it is technically difficult to further increase the radiance of a lamp of the long arc type and a microwave UV lamp that has light emitting parts which are large.

Moreover, in the above described inkjet printer, there are the following disadvantages:

In a conventional inkjet printer, for example, with the arrangement shown in FIG. 13, the light exit openings 81A of the light irradiation apparatus 80A, 80B, and the light exit opening 83B of the reflector 83 open in the same direction. This means that the recording medium R is directly irradiated with light from the discharge lamp 82 which contains light from the visible range to the IR range which is unnecessary for setting of the ink of the UV radiation setting type, and moreover, also radiant heat is incident on the recording medium R in the course of operation of the discharge lamp 82. The recording medium R is heated by the light and the radiant heat from the visible wavelength range to the IR wavelength range so that a high temperature is reached.

Since, in many cases, the recording medium R is one that can be easily deformed by heat, such as, for example, paper, resin, film and the like, the amount of influence of heat on the recording medium R by unnecessary light from the visible range to the IR range and by the radiant heat of the discharge lamp in the case of using a discharge lamp becomes large because a high peak irradiance is to be obtained in order to carry out setting treatment of the ink of the UV radiation setting type with high efficiency. The recording medium R is thus shifted into a still higher temperature state, by which there are the disadvantages that deformations and the like often arise and it becomes difficult to form pictures with high image quality.

In view of these disadvantages, it can be imagined that there is a reflection mirror (also called a cold mirror) between the discharge lamp and the recording medium which reflects only light with wavelengths which are necessary for the setting of the ink and on which a film is formed by vapor deposition which transmits light with other wavelengths, so that the recording medium is irradiated only with light which is reflected by this reflection mirror and that thus the heat effect on the recording medium is reduced.

However, in the case of an arrangement of such a reflection mirror, the length of the optical path between the discharge lamp and the recording medium is increased by which, for example, focusing is impossible in the case of a discharge lamp of the long arc type with respect to the lengthwise direction of the discharge lamp. The area irradiated with light is increased in this way so that the degree of light utilization is reduced, and at the same time, it becomes impossible to obtain a relatively high irradiance on the light irradiation area.

As was described above, in reality, for an inkjet printer using the inkjet method of the photosetting type, an improvement of the setting treatment of the ink could not be achieved by using an inkjet printer with high radiance of the light source lamp in itself, and thus, an increase of the peak irradiance on the irradiated surface could not be achieved.

SUMMARY OF THE INVENTION

The invention was devised to eliminate the above described disadvantages in the prior art. Thus, a primary object of the invention is to devise a light irradiation apparatus in which high peak irradiance can be obtained while the amount of heat influence on the article which is to be irradiated with light can be reduced.

Another object of the invention is to devise an inkjet printer which has the above described light irradiation apparatus in which setting treatment of the ink can be achieved with high efficiency, so that pictures can reliably be made with high image quality while the amount of heat influence on the recording medium is low.

As a result of diligent research by the inventors, they have found that the above described objects can be achieved by an arrangement in which the light source lamp is a discharge lamp of the short arc type with higher radiance than a discharge lamp of the long arc type and in which there is an optical system with a reflection component which focuses light from this discharge lamp and emits it such that it extends linearly.

The object is achieved in accordance with the invention in a light irradiation apparatus which comprises the following:

- a discharge lamp of the short arc type having a discharge vessel in which there is a pair of opposed electrodes; and
- a reflection component which reflects light from this discharge lamp, the reflection component focusing light from the discharge lamp such that it extends linearly and that the reflection component thus forms a light irradiation region.

In the light irradiation apparatus in accordance with the invention, the light from the discharge lamp can be focused and emitted extending linearly by the arrangement (1) or (2) described below.

(1) Arrangement in which the reflection component is formed from a reflector which is arranged such that it surrounds the discharge lamp, and which reflects light from this discharge lamp, and in which the reflector is one in which, assuming a three-dimensional orthogonal coordinate system with an X axis that corresponds to the optical axis of the reflector, the reflection surface is oval in cross section through the X-Y plane and in which the reflection surface is parabolic in cross section through the X-Z plane.

(2) Arrangement in which the reflection component is formed from a reflector which is arranged such that it surrounds the discharge lamp and which reflects light from this discharge lamp, and from a reflection mirror with a cylindrical reflection surface which reflects the light reflected by this reflector and focuses it only in a single axial direction.

Specific examples of this arrangement are described below by way of example.

(1) Arrangement in which a reflector with a reflection surface in the form of a paraboloid of rotation is used with a center which is the optical axis of the reflector, and in which a reflection mirror with a reflection surface with a parabolic cross section is used.

(2) Arrangement in which a reflector with a reflection surface in the form of an ellipsoid of rotation is used with a center which is the optical axis of the reflector, and in which a reflection mirror with a reflection surface with an oval cross section is used.

The object is furthermore achieved in accordance with the invention in a light irradiation apparatus which comprises the following:

a discharge lamp of the short arc type having a discharge vessel in which there is a pair of opposed electrodes; and several light source parts which are arranged such that they surround this discharge lamp and which are formed of reflectors which reflect light from this discharge lamp, the light source parts being located next to one another, and thus, at least part of the light irradiation regions formed by the light source parts which are located next to one another overlap one another at the light irradiation surface.

The object is also achieved in accordance with the invention in an inkjet printer which comprises the following:

a write head which applies ink of the photosetting type to the recording medium; and a head part with a light irradiation apparatus which irradiates with light for setting of the ink which has been applied to the recording medium, wherein the write head delivers the ink to the recording medium by the head part and the recording medium being moved relative to one another, and in which, by irradiation of the ink which has been applied to this recording medium with light from the light irradiation apparatus in accordance with the invention, the ink is set and pictures are recorded.

ACTION OF THE INVENTION

With the light irradiation apparatus in accordance with the invention, by using a discharge lamp of the short arc type as the light source lamp and by arranging an optical system with a certain reflection component, the light from the discharge lamp of the short arc type which forms a point light source in each direction of the light irradiation surface can be focused to extend linearly by the broadening of the light irradiation region on the recording medium according to the increase of the length of the optical path being suppressed. Therefore, the light from the discharge lamp can be used with high efficiency. Moreover, since the radiance of the discharge lamp is inherently high, a high peak irradiance can be obtained on the area to be irradiated.

Furthermore, by the arrangement in which the light from the light source lamp is reflected by the reflection component and thus emerges, direct incidence of the light from the visible range to the IR range which is contained in the radiant light from the discharge lamp, and direct incidence of the radiant heat in the course of discharge lamp operation onto the article to be irradiated with light are prevented in the case in which for example light in the UV range emerges. Thus, the amount of heat influence on the article to be irradiated with light can be reduced.

By the inkjet printer with the above described light irradiation apparatus, ink of the photosetting type which has been applied to the recording medium is irradiated with light from the discharge lamp with high irradiance so that the ink can set (photopolymerize) immediately after application to the recording medium with high efficiency. In this way, the time necessary for setting can be reduced, and as a result, changing of the dot form can be prevented. Therefore, pictures with high image quality can be reliably formed. Furthermore, especially since, for an inkjet printer using ink of the UV radiation setting type, the light from the discharge lamp is reflected and thus the recording medium is irradiated, the light from the IR range to the visible range contained in the radiant light from the discharge lamp which is unnecessary for setting of the ink, and the radiant heat in the course of operation of the discharge lamp can be prevented from being directly incident on the recording medium. Therefore, the amount of heat influence on the recording medium can be reduced and deformation of the recording medium can be prevented.

In accordance with the invention, the light irradiation apparatus (lamp housing) can be produced that is smaller and lighter than one with a discharge lamp of the long arc type. Therefore, the weight of the entire inkjet printer can be reduced, and moreover, the printing speed can be increased by increasing the efficiency of the setting treatment of the ink.

The invention is explained in detail below with reference to the accompanying drawings.

DETAILED DESCRIPTION OF THE INVENTION

First Embodiment

The light irradiation apparatus according to the first embodiment of the invention comprises the following:

- a discharge lamp of the short arc type;
- at least one light source part having a reflector which reflects light from the discharge lamp; and
- a reflection mirror which reflects the light radiated from the light source part and allows it to emerge.

In this connection, the light from the discharge lamp is focused and emitted by a reflection component which is comprised of the reflector and the reflection mirror, such that a linearly extending light irradiation region is formed on the surface to be irradiated.

Figure 1:
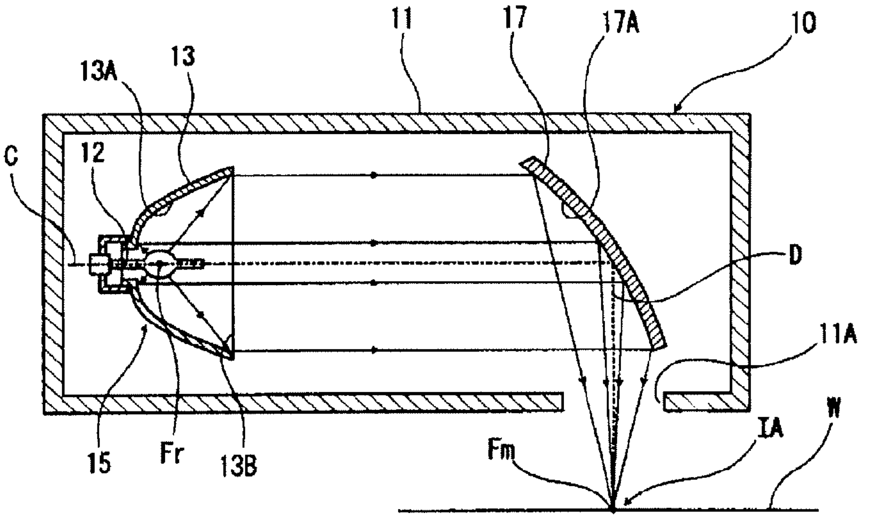
FIG. 1 is a schematic cross-sectional view of the arrangement of important parts of an example of a first embodiment of the light irradiation apparatus in accordance with the invention.

FIG. 1 is a schematic cross-sectional view of the arrangement of important parts of one example of a first embodiment of the light irradiation apparatus in accordance with the invention. This light irradiation apparatus 10 has an outside cover 11 that is, for example, box-shaped and which has a light exit opening 11A which is open in one direction (to the bottom in FIG. 1). In the outside cover 11, there are a discharge lamp 12 of the short arc type, a light source part 15 which surrounds this discharge lamp 12 and which has a reflector 13 which reflects light from the discharge lamp 12, and a reflection mirror 17 which is used to reflect the light from the light source part 15 so as to allow it to emerge to the outside via the light exit opening 11A.

The reflector 13 of the light source part 15 is formed by a parabolic mirror with a reflection surface 13A in the form of a paraboloid of rotation, with a center which is aligned with the optical axis C of the reflector 13. The optical axis C is arranged in a position which runs parallel to the light irradiation area W such that a light exit opening 13B of the reflector 13 is open in the direction which differs from the light exit opening 11A of the light irradiation apparatus 10, for example to the right in FIG. 1.

The discharge lamp 12 of the light source part 15 comprises an ultra-high pressure mercury lamp which emits UV radiation, for example, with wavelengths from 300 nm to 450 nm with high efficiency. The discharge lamp 12 has a discharge vessel in which there is a pair of opposed electrodes with a distance between the electrodes of, for example, from 0.5 mm to 2.0 mm, and mercury, as the emission substance, rare gas, as the buffer gas as a starting aid, and halogen, each in a given added amount. The added amount of mercury, here, is for example, 0.08 mg/mm$^3$ to 0.30 mg/mm$^3$. The discharge lamp 12 in the state in which the light emitting part (for example, the arc radiance spot) is located at the focal point Fr of the reflector 11 is arranged such that a line which is formed between the electrodes extends along the optical axis C of the reflector 11.

The reflection mirror 17 is formed of a bucket-shaped parabolic mirror which has a parabolic reflection surface only in a single axial direction, i.e. its reflection surface 17A is parabolic in cross section in a plane along the light exit direction which contains the optical axis C of the reflector 11 and the optical axis D of the reflection mirror 17. The reflection mirror 17 in the state in which the reflection surface 17A is opposite the light exit opening 13B of the light source part 15 and the light exit opening 11A of the light irradiation apparatus 10 and in which the focal point Fm is in a region that is on the light irradiation area W which faces the light exit opening 11A, is arranged such that it extends along the width of light irradiation area W (in the direction perpendicular to, i.e., into and out of, the page of the drawing in FIG. 1).

In this light irradiation apparatus 10, the light emitted from the discharge lamp 12 is reflected by the reflection surface 13A in the form of a paraboloid of rotation of the reflector 13, by which the light is collimated along the optical axis C and is radiated via the light exit opening 13B in the direction toward the reflection mirror 17. The collimated light which is incident on the reflection mirror 17 is reflected by the cylindrical reflection surface 17A of the reflection mirror 17 with a parabolic cross section, by which in the lengthwise direction of the reflection mirror 17 (in FIG. 1 in the direction perpendicular to the page of the drawings) it is focused unchanged as parallel light without focusing only in the direction of the optical axis of the reflector 13 (to the right and left in FIG. 1), and emerges at the same time via the light exit opening 11A. In this way, the light from the discharge lamp 12 is emitted such that a light irradiation region IA which extends linearly in the lengthwise direction of the reflection mirror 17 is formed on the light irradiation area W at the focal point Fm of the reflection mirror 17.

A discharge lamp 12 of the short arc type is used by the light irradiation apparatus 10 with the above described arrangement as the light source lamp. By the arrangement of the optical system a reflection component is formed by a combination of the reflector 13 and the reflection mirror 17 having the reflection surfaces 13A, 17A, each with a certain form, the light from the discharge lamp 12 which forms a point light source can be focused such that it extends linearly on the light irradiation surface W in the direction which orthogonally intersects the optical axis of the reflector 13 while simultaneously suppressing broadening of the light irradiation region IA formed on the light irradiation area W despite the increasing of the length of the optical path. Therefore, the light from the discharge lamp 12 can be used with high efficiency. Moreover, since the radiance of the discharge lamp 12 is inherently high, the light irradiation region IA which is formed on the surface W to be irradiated becomes linear, with an effective region having a high peak irradiance.

Second Embodiment

The light irradiation apparatus according to the second embodiment of the invention has a discharge lamp of the short arc type and at least one light source part of a reflector which reflects the light from this discharge lamp. A reflection component of at least the reflector focuses and emits the light from the discharge lamp such that a linearly extending light irradiation region is formed on the surface to be irradiated.

Figure 2:
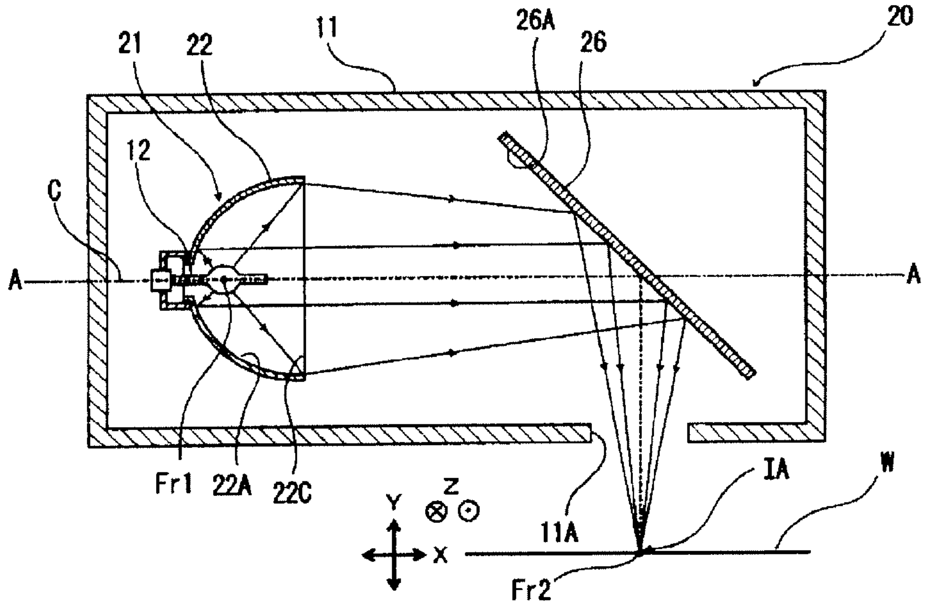
FIG. 2 is a schematic cross-sectional view of the arrangement of important parts of an example of a second embodiment of the light irradiation apparatus in accordance with the invention.
Figure 3:
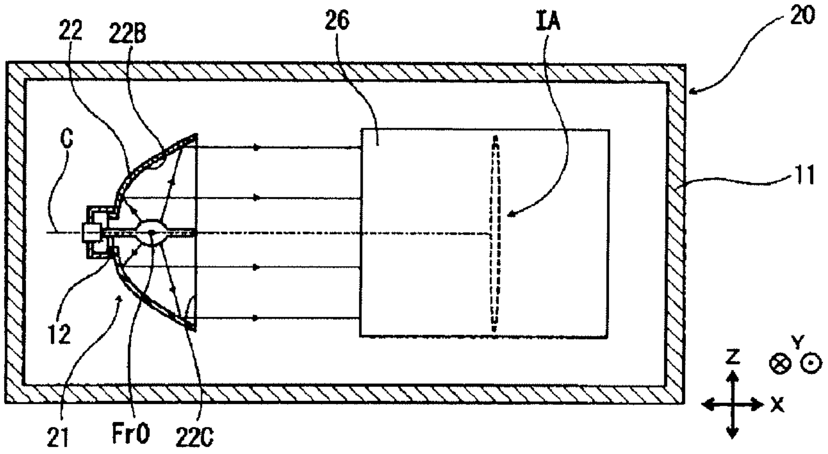
FIG. 3 is a partial cross-sectional view through a plane which runs parallel to the light irradiation area for the light irradiation apparatus taken along line A-A in FIG. 2.

FIG. 2 shows a schematic cross section of the arrangement of important parts of one example of the second embodiment of the light irradiation apparatus in accordance with the invention. FIG. 3 is a partial cross section taken along line A-A in FIG. 2, which is along a plane in the light irradiation apparatus 20 which runs parallel to the light irradiation surface W.

This light irradiation apparatus 20 has the same basic arrangement as the light irradiation apparatus 10 according to the above described first embodiment. In the outer cover 11 with a light exit opening 11A which is open in a single direction (down in FIG. 2), there are the discharge lamp 12 of the short arc type and a light source part 21 with a reflector 22 which surrounds this discharge lamp 12 and reflects the light from the discharge lamp 12, and a reflection mirror 26 which is used to reflect the light from the light source part 21 and to allow it to emerge to the outside via the light exit opening 11A.

Figure 4:
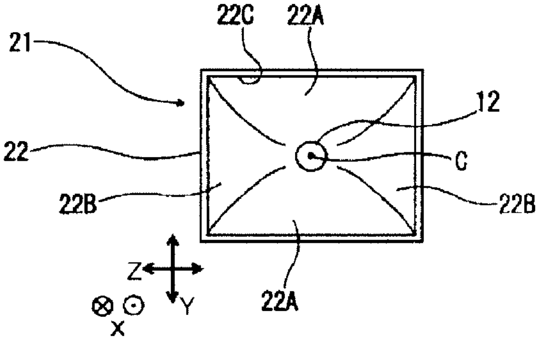
FIG. 4 shows the light source part as viewed from the direction of its front side (direction of the opening of the reflector)

The reflector 22 of the light source part 21, assuming a three-dimensional, orthogonal coordinate system surface (see the lower center of FIG. 2 and lower right of FIG. 3) with an X-axis which is the optical axis C of the reflector 22, has a combined reflection surface with a reflection surface 22A which is oval in cross section in the X-Y plane (FIG. 2), and is a cylindrical reflection surface with a reflection surface 22B which is parabolic in cross section in the X-Z plane (see FIG. 3). In FIG. 4 the light source part 21 is viewed from the direction of the front side (direction of the opening of the reflector 22). As was described above, the reflector 22 has two types of reflection surfaces, specifically a cylindrical, elliptical surface, and a cylindrical, parabolic surface. Due to the different curvatures between the Y-direction and the Z-direction, in the region in which the two reflection surfaces come to rest on one another, a boundary line forms.

The reflector 22 is located in a position in which the optical axis C runs parallel to the light irradiation surface W so that its light exit opening 22C is open in a direction which differs from the light exit opening 11A in the light irradiation apparatus 20, for example, to the right in FIG. 2.

The reflector 22, is positioned on the optical axis C with the first focal point Fr1 of the oval reflection surface 22A and the focal point Fr0 of the parabolic reflection surface 22B being in agreement with one another. The discharge lamp 12 of the light source part 21 has the same arrangement as the one according to the first embodiment. In the state in which the light emitting part (for example, the arc radiance spot) is positioned in the first focal point Fr1 of the oval reflection surface 22A for the reflector 22, the lamp is arranged such that a straight line which forms between the pair of electrodes extends along the optical axis C of the reflector 22.

The reflection mirror 26 is a plane mirror with a reflection surface 26A which is opposite the light exit opening 22C of the light source part 21 and the light exit opening 11A of the light irradiation apparatus 20, and in the state in which the second focal point Fr2 of the elliptical reflection surface 22A of the reflector 22 which is described below (mirror image of the second focal point through the reflector 26) is positioned on the light irradiation area W within the region opposite the light exit opening 11A, and is arranged such that it extends along the light irradiation area W (in the direction perpendicular to the page of the drawings, Z direction in FIG. 2).

For this light irradiation apparatus 20, the light which is emitted from the discharge lamp 12 is reflected by the reflector 22, by which the light which has been reflected by the parabolic reflection surface 22B of the reflector 22 is made into parallel light along the optical axis C and by which, moreover, the light reflected from the oval reflection surface 22A of the reflector 22 is emitted via the light irradiation opening 22C from the reflection mirror 26 such that it is focused at the second focal point Fr2 of this reflection surface 22A having been deflected by the reflection mirror 26 in the direction to the light irradiation area W.

In this way, the light from the discharge lamp 12 is emitted in such a way that it is parallel light in the Z axial direction in the drawings, that it is focused only in the X axial direction and that a light irradiation region IA is formed on the light irradiation area W that extends linearly in the direction (Z direction) which orthogonally intersects the optical axis C of the reflector.

In the light irradiation apparatus 20 according to this second embodiment, the reflection mirror 26 is used only for deflecting the optical path through the reflector 22 to the side of the light irradiation area W. The reflection mirror 26 is superfluous in the case of the arrangement of the optical axis C of the reflector 22 parallel to the Y-axis in the drawings for emergence of the light reflected from the reflector 22 directly from the light exit opening 11A.

A discharge lamp 12 of the short arc type is used by the light irradiation apparatus 20 with the above described arrangement as the light source lamp. By the arrangement of the optical system with a certain reflection component with a reflector 22 with the combined reflection surface which contains a reflection surface 22A with a certain form, the light from the discharge lamp 12 which forms a point light source, for example, in the direction which orthogonally intersects the optical axis C of the reflector can be focused extending linearly on the light irradiation area W by the broadening of the light irradiation region IA on the light irradiation area being suppressed according to the increase in the length of the optical path. Therefore, the light from the discharge lamp can be used with high efficiency.

Moreover, since the radiance of the discharge lamp 12 is inherently high, the light irradiation area IA which is formed on the area W to be irradiated becomes linear and has an effective region with a high peak irradiance.

Third Embodiment

The light irradiation apparatus according to the third embodiment of the invention comprises a discharge lamp of the short arc type, at least one light source part of a reflector which reflects the light from this discharge lamp, and a reflection mirror which reflects the light emitted by the light source part and allows it to emerge. A component formed of the reflector and the reflection mirror focuses and emits the light from the discharge lamp such that a linearly extending light irradiation region is formed on the surface which is to be irradiated.

Figure 5:
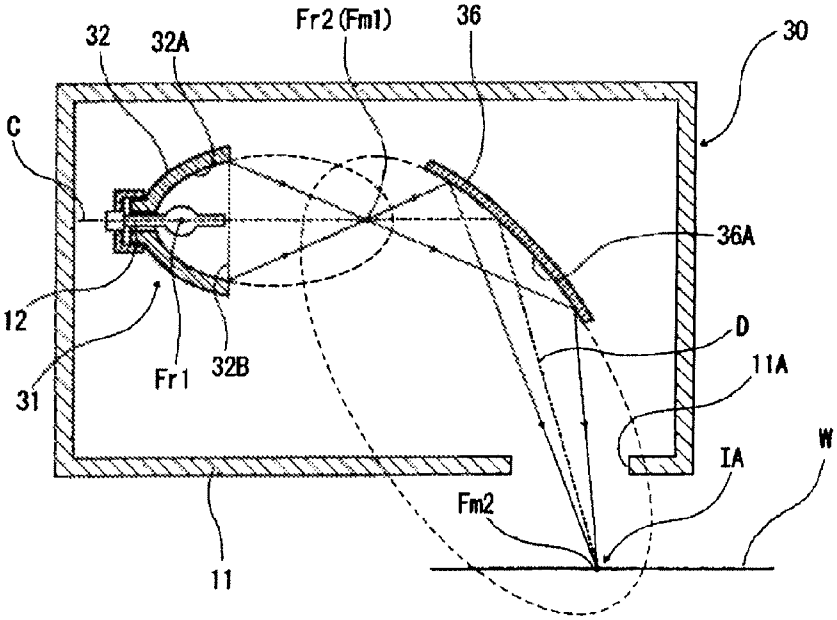
FIG. 5 is a schematic cross-sectional view of the arrangement of important parts of an example of a third embodiment of the light irradiation apparatus in accordance with the invention.

FIG. 5 shows a schematic cross section of the arrangement of important parts of one example of the third embodiment of the light irradiation apparatus in accordance with the invention. This light irradiation apparatus 30 has the same basic arrangement as the light irradiation apparatus 10 according to the above described first embodiment. In the outer cover 11 with a light exit opening 11A which is open in a single direction (down in FIG. 5), there are the discharge lamp 12 of the short arc type, a light source part 31 with a reflector 32 which surrounds this discharge lamp 12 and reflects the light from the discharge lamp 12, and a reflection mirror 36 which is used to reflect the light from the light source part 31 and to allow it to emerge to the outside via the light exit opening 11A.

The reflector 32 of the light source part 31 is an oval focusing mirror with a reflection surface 32A in the form of an ellipsoid of rotation, with a center which is on the optical axis C of the reflector 32. The reflector 32 is located in a position in which the optical axis C runs parallel to the light irradiation area W so that the light exit opening 32B of the reflector 32 is open in a direction which differs from the light exit opening 11A in the light irradiation apparatus 30, for example, to the right in FIG. 5.

The discharge lamp 12 of the light source part 31 has the same arrangement as the one according to the first embodiment, and in the state in which the light emitting part (for example, the arc radiance spot) is located at the first focal point Fr1 of the reflection surface 32A in the form of an ellipsoid of rotation of the reflector 32, is arranged such that the straight line which is formed between the electrodes extends along the optical axis C of the reflector 32.

The reflection mirror 36 is a bucket-shaped, cylindrical oval mirror with a reflection surface which is oval only in a single axial direction, i.e., with an ellipsoidal reflection surface 36A in a cross section through a plane along the light exit direction which contains the optical axis C of the reflector 32 and the optical axis D of the reflection mirror 36. The reflection surface 36A is opposite the light exit opening 32B of the light source part 31 and the light exit opening 11A of the light irradiation apparatus 30. The first focal point Fm1 coincides with the second focal point Fr2 of the reflection surface 32A for the reflector 32. The reflection surface 36A, in the state in which the second focal point Fm2 is positioned within the region opposite the light exit opening 11A on the light irradiation area W, is arranged such that it extends along the light irradiation area W (in the direction perpendicular to the page of the drawings in FIG. 5).

Light with high radiance from the discharge lamp 12 can be linearly focused on the second focal point Fm2 of the reflection mirror 36 by this measure that the second focal point Fr2 of the reflector 32 coincides with the first focal point Fm1 of the reflection mirror 36.

In this light irradiation apparatus 30, the light which has been radiated from the discharge lamp 12 is reflected by the reflector 32 with the reflection surface 32A in the form of an ellipsoid of rotation, by which it is emitted via the light exit opening 32B in the direction to the reflection mirror 36 in order to be focused at the second focal point Fr2 of the reflection surface 32A in the form of an ellipsoid of rotation of the reflector 32. At the second focal point Fr2 of the reflection surface 32A of the reflector 32, the light is focused once again, and afterwards, is incident as it propagates in the reflection mirror 36. The light which is incident in the reflection mirror 36 is reflected by the cylindrical reflection surface 36A with an oval cross section, by which it continues to propagate in the lengthwise direction of the reflection mirror 36 (in the direction perpendicular to the page of the drawings in FIG. 5) without focusing, but emerges only in the direction of the optical axis (to the right and left in FIG. 5) of the reflector 32 by simultaneous focusing via the light exit opening 11A. In this way, the light from the discharge lamp 12 is emitted such that, on the light irradiation surface W at the second focal point Fm2 of the reflection mirror 36, a region of irradiating light IA is formed which extends linearly in the direction which orthogonally intersects the optical axis C of the reflector 32.

A discharge lamp 12 of the short arc type is used by the light irradiation apparatus 30 with the above described arrangement as the light source lamp. By the arrangement of the optical system with the reflection component which is formed by a combination of the reflector 32 with the reflection surfaces 32A, 36A, each with a certain form and with a focusing function with the reflection mirror 36, the light from the discharge lamp 12 which forms a point light source, with simultaneous suppression of broadening of the light irradiation region IA formed on the light irradiation area W in the course of increasing the length of the optical path, can be focused such that it extends linearly on the light irradiation area W in the direction which orthogonally intersects the optical axis C of the reflector 32. Therefore, the light from the discharge lamp 12 can be used with high efficiency. Moreover, since the radiance of the discharge lamp 12 is inherently high, the light irradiation region IA which is formed on the area W to be irradiated becomes linear with an effective region of high peak irradiance having a given size.

The effect which is described below can also be obtained by the arrangement (the optical system) in which the reflector 32 of the oval focusing mirror with the reflection surface 32A in the form of an ellipsoid of rotation is combined with the reflection mirror 36 of the cylindrical oval mirror with the oval reflection surface 36A and in which the light from the discharge lamp 12 is linearly focused and emitted.

The angle of light propagation, after it has been focused on the second focal point Fr2 of the reflector 32, can be set based on the curvature of the reflector 32. Furthermore, since the focal position of the light reflected by the reflection mirror 36 (magnitude of the focal length) can be set based on the curvature of the reflection mirror 36, by adjusting the curvature of the reflector 32 and the curvature of the reflection mirror 36, the length of the light irradiation region IA which is formed to extend linearly can be suitably adjusted according to the purpose.

For all light irradiation apparatus according to the first to third embodiments, the arrangement with a single light source device was described above. However, since a light irradiation region with a suitable size can be obtained according to the size of the article which is to be irradiated with light, in reality, an arrangement with several light source parts is advantageous. By way of example, a light irradiation apparatus according to the first embodiment, for example, with two light source parts is described below.

Figure 6:
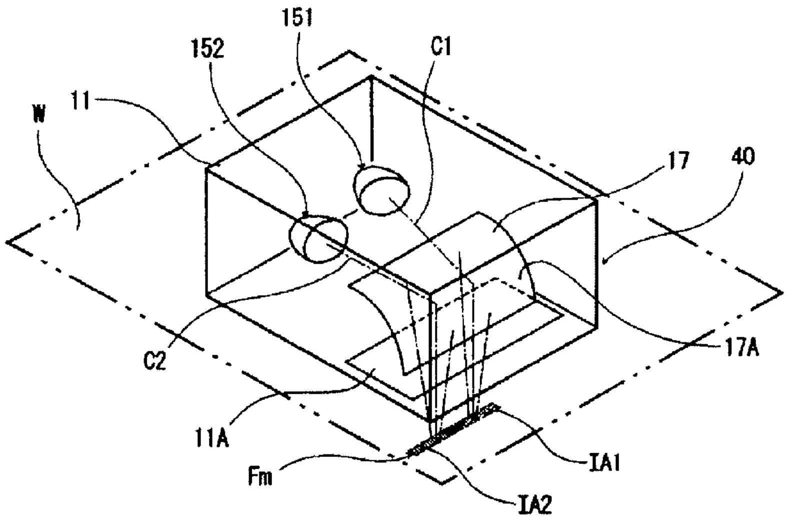
FIG. 6 is a schematic perspective view of the arrangement of important parts of another example of the first embodiment of the light irradiation apparatus in accordance with the invention.
Figure 7:
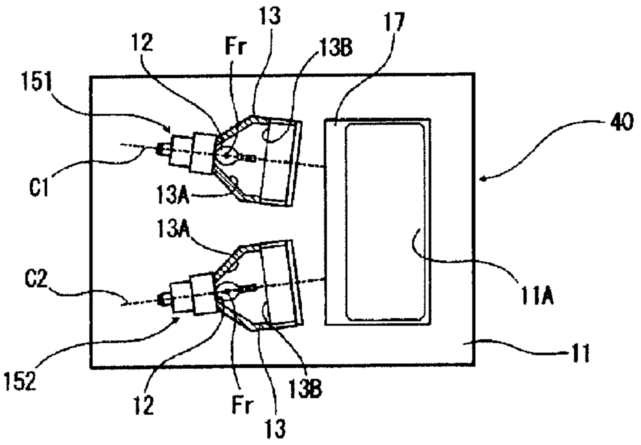
FIG. 7 is a cross-sectional view of the light irradiation apparatus shown in FIG. 6 viewed looking toward the light irradiation area from above.

FIG. 6 shows a schematic perspective of the arrangement of important parts of another example of the first embodiment of the light irradiation apparatus in accordance with the invention. FIG. 7 is a top view of the light irradiation apparatus shown in FIG. 6. This light irradiation apparatus 40 has an outside cover 11 with a light exit opening 11A which is open in a single direction (down in FIG. 6). In this outside cover 11, there are two light source parts 151, 152 with discharge lamps 12 of the short arc type and reflectors 13 which surround these discharge lamps 12 so as to reflect the light from the discharge lamps 12. Moreover, there is a single reflection mirror 17 which is used to reflect the light from the light source parts 151, 152 and to cause the light to emerge via the light exit opening 11A to the outside.

One light source part 151 has the same arrangement as the one shown in FIG. 1. The reflector 13 is formed of a parabolic mirror with a reflection surface 13A in the form of a paraboloid of rotation, with a center which is the optical axis C1 of the reflector 13. The discharge lamps 12, with the same arrangement as those according to the first embodiment in the state in which the light emitting part (for example the arc radiance spot) hereof is positioned at the focal point Fr of the reflection surface 13A of the paraboloid of rotation of the reflector 13, are arranged such that a line which is formed between the electrodes extends along the optical axis C1 of the reflector 13. The other light source 152 also has this arrangement.

The light source parts 151, 152 are located next to one another positioned so that they extend in directions which cross with respect to the reflection surface 17A of the reflection mirror 17 such that both the optical axis C1 of one light source part 151 and also the optical axis C2 of the other light source part 152 run parallel to the light irradiation area W and wherein the peripheral regions of light irradiation regions IA1, IA2 produced by the light source parts 151, 152 come to rest on one another uninterruptedly.

The reflection mirror 17 has the same arrangement as according to FIG. 1 and is a bucket-shaped, cylindrical parabolic mirror with a reflection surface 17A which is parabolic only in a single axial direction.

In this light irradiation apparatus 40, the light emitted from the discharge lamps 12 of the respective light source parts 151, 152 is reflected by the reflectors 13, by which the light becomes parallel light which runs along the optical axis C1 and the optical axis C2 and is radiated via the light exit openings 13B toward the reflection mirror 17. The parallel light which is incident on the reflection mirror 17 from the light source parts 151, 152 is reflected by the cylindrical reflection surface 17A of the reflection mirror 17 with a parabolic cross section, by which it emerges without focusing in the lengthwise direction of the reflection mirror 17 (up and down in FIG. 7) only with simultaneous focusing in the direction which orthogonally intersects the lengthwise direction of the reflection mirror 17 (to the right and left in FIG. 7) via the light exit opening 11A. In this way, the light from the discharge lamps 12 is emitted such that part (peripheral regions) of the light irradiation areas IA1, IA2 produced by the respective light source parts 151, 152 are formed to extend linearly in the lengthwise direction of the reflection mirror 17 on the light irradiation area W which is located at the focal point Fm of the reflection mirror 17.

Peripheral regions that have a lower irradiance than the middle region come to rest on one another by the light irradiation apparatus 40 with the above described arrangement in the respective light irradiation regions IA1, IA2 which are formed to extend linearly on the light irradiation area W. In this way, the irradiance is added so that a state is obtained with the same irradiance in the peripheral regions as in the middle region. In the light irradiation regions, the effective region with a relatively high irradiance can be set to be large in this way so that light irradiation regions with an advantageously large size can be obtained. A test which was carried out for confirmation of this action is shown by way of example below.

EXPERIMENTAL EXAMPLE

According to the arrangement shown in FIGS. 6 & 7, a light irradiation apparatus 40 in accordance with the invention was produced. The discharge lamp 12 of the respective light source parts 151, 152 was an ultra-high pressure mercury lamp with a distance of 1.2 mm between the electrodes and a rated wattage of 210 W. The reflector 12 was a parabolic mirror with an effective mirror area size of the light exit opening 13B of roughly 44 mm×48 mm and a focal length of 6 mm. The reflection mirror 17 was a cylindrical parabolic mirror with a focal length of 60 mm.

In the state in which the light irradiation region with regard to the respective light source parts 151, 152 is, for example, 50 mm and the length of the effective region with relatively high irradiance was 65 mm in all the light irradiation regions by placing the partial peripheral regions on top of one another, the respective light source parts 151, 152 were angled in the direction which crosses the reflection surface 17A of the reflection mirror 17 and were arranged thusly. The distance between the light exit opening 11A and the light irradiation area W was 22 mm.

Figure 13:
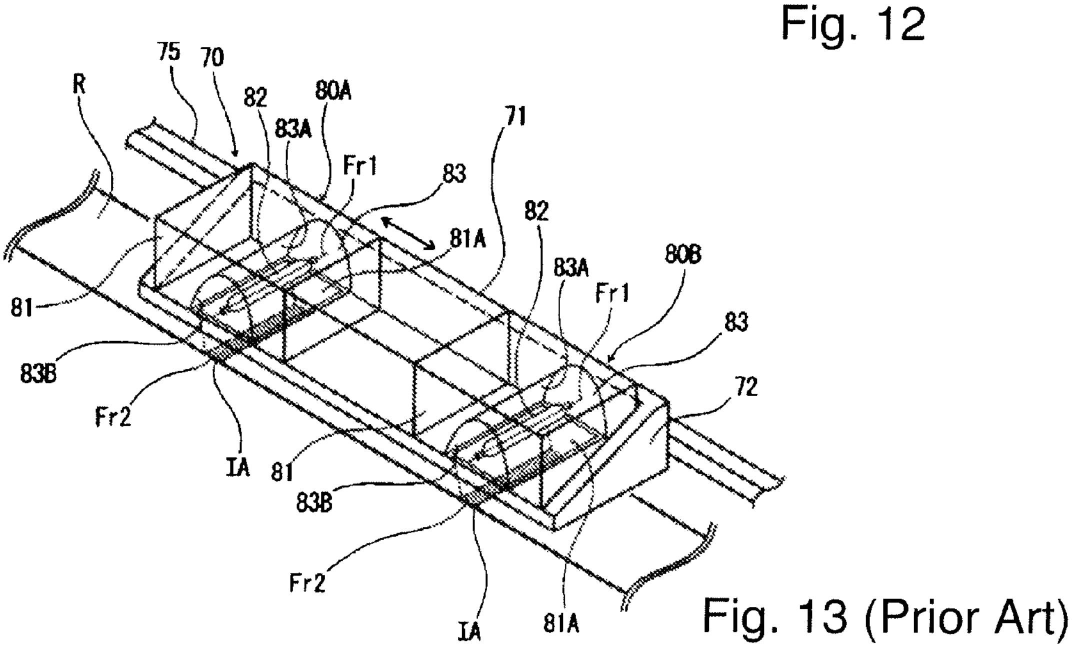
Fig. 13 (Prior Art)
FIG. 13 is a schematic cross-sectional view of the arrangement of important parts of an example of an inkjet printer using a conventional inkjet method of the photosetting type.

Additionally, for comparison purposes, a lamp housing "UVH-1500M/XJ" (produced by Ushio Denki Kabushiki Kaisha) was provided in which the light source lamp was a metal halide lamp with a rated wattage of 1500 W and an emission length of 125 mm and in which, with respect to the light irradiation direction downstream from the metal halide lamp, there was an oval cold mirror with a focal length of roughly 120 mm (see the light irradiation apparatus in FIG. 13).

Figure 8:
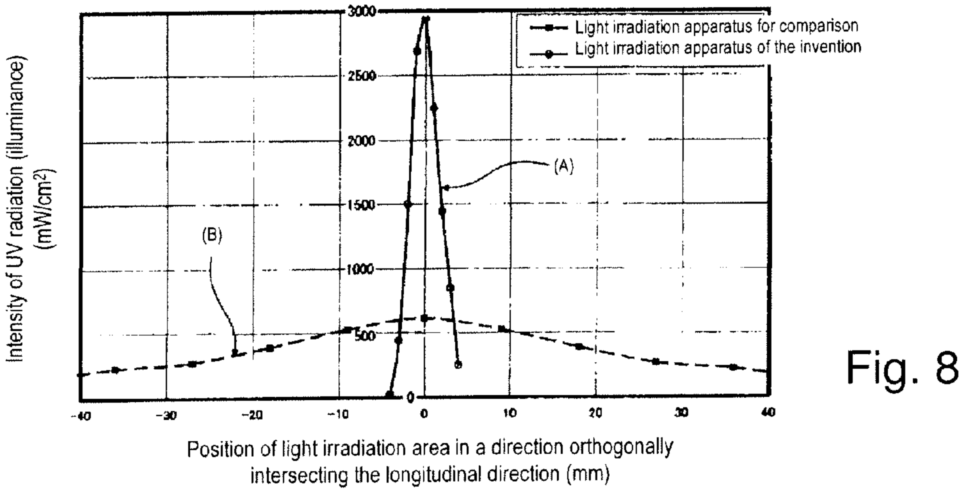
FIG. 8 is a graph showing the distribution of the radiance of the UV radiation (distribution of irradiance) in the light irradiation region produced by the light irradiation apparatus in accordance with the invention in a direction that orthogonally intersects the lengthwise direction of the light irradiation region, and that produced by a light irradiation apparatus which has a discharge lamp of the long arc type, for comparison purposes.

In the respective light irradiation apparatus, the UV radiation intensity (irradiance) of the linear light irradiation region formed on the light irradiation area was measured in the direction which orthogonally intersects this lengthwise direction. As shown in FIG. 8, it has been confirmed that in spite of a magnitude of the wattage delivered to the discharge lamp of the light irradiation apparatus accordance with the invention that was less than or equal to ⅓ of the wattage delivered to the light source lamp of the prior art light irradiation apparatus used for comparison purposes, a peak irradiance (2900 $mW/cm^2$) was obtained by the light irradiation apparatus in accordance with the invention (see curve (A)) which is roughly five times greater than that obtained by the light irradiation apparatus for comparison purposes (see curve (B)) with a value of the peak irradiance of roughly 600 $mW/cm^2$.

The light irradiation apparatus according to the first embodiment was described above by way of example. However, for the light irradiation apparatus according to the second and third embodiments, arrangements with several light source parts can be undertaken. The same effect as the one described above can be obtained by such arrangements.

Since especially for a light irradiation apparatus according to the third embodiment, the length of the light irradiation region with respect to the adjacent light source parts can be regulated by suitable adjustment of the curvature of the reflector and the curvature of the reflection mirror according to the purpose, the size of the regions which come to rest on one another can be adjusted and the irradiance of the peripheral region with a lower irradiance, for example, than in the middle region can be supplemented, it becomes simpler to achieve a uniform distribution of the irradiance in the lengthwise direction of the light irradiation regions. Moreover, the peripheral regions of the light irradiation regions with respect to the adjacent light source parts can be placed on top of one another without, for example, arranging two light source parts such that their optical axes are obliquely angled relative to the reflection mirror. Thus, the construction of the arrangement of the device is simplified.

Figure 9:
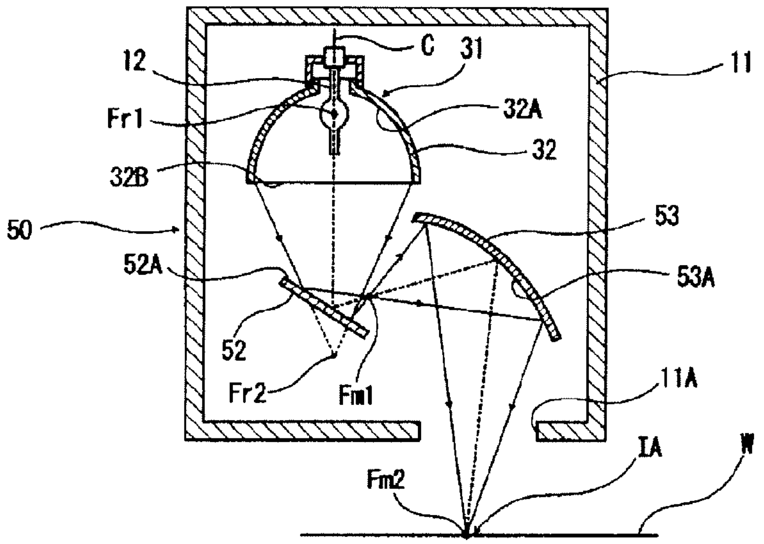
FIG. 9 is a schematic cross-sectional view of the arrangement of important parts of another example of the third embodiment of the light irradiation apparatus in accordance with the invention.

In the above described respective light irradiation apparatus according to the first to third embodiments, an arrangement was described in which the light source part is located at a position in which the optical axis of the reflector runs parallel to the light irradiation area. However, as shown in FIG. 9, for example, an arrangement can be undertaken in which the light source part 31 is located at a position in which the optical axis C of the reflector 32 runs in a direction perpendicular to the light irradiation area W. In this arrangement, the same action as for the light irradiation apparatus 10, 20, 30 according to the above described first to third embodiments is also obtained. Furthermore, since the discharge lamp 12 can be set up in the vertical direction, the width of a light irradiation apparatus (lamp housing) 50 can be made compact. This light irradiation apparatus 50 has the arrangement according to the above described third embodiment in which the light from the discharge lamp 12 is focused and emitted by a reflection component comprised of a reflector 32 and a reflection mirror 53 such that on the area W which is to be irradiated a linearly extending light irradiation region IA is formed.

The arrangement of the light irradiation apparatus 50 is described specifically below. It has an outside cover 11 with a box-like overall shape with a light exit opening 11A which is open in a single direction (down in FIG. 9). In this outside cover 11, there are a discharge lamp 12 of the short arc type, a light source part 31 which surrounds this discharge lamp 12 and which has a reflector 32 which reflects light from the discharge lamp 12, and two reflection mirrors which are used to reflect the light from the light source part 31 and to allow it to emerge to the outside via the light exit opening 11A.

The reflector 32 of the light source part 31 has a reflection surface 32A in the form of an ellipsoid of rotation, with a center which is the optical axis C of the reflector 32. It is located at a position in which the optical axis C runs perpendicular to the light irradiation area W so that light exit opening 32B of the reflector 32 is open in the same direction as the light exit opening 11A in the light irradiation apparatus 50.

The discharge lamp 12 of the light source part 31 has the same arrangement as the one according to the above described first embodiment. It extends along the optical axis C of the reflector 32 in the state in which the light emitting part (for example, the arc radiance spot) is positioned at the first focal point Fr1 of the reflection surface 32A in the form of an ellipsoid of rotation of the reflector 32.

The two reflection mirrors comprise a first reflection mirror 52, which is a planar mirror, and a second reflection mirror 53, that is a bucket-shaped, cylindrical oval mirror with an oval reflection surface 53A which is curved in only one direction.

The first reflection mirror 52 is in front of the second focal point Fr2 of the reflection surface 32A of the reflector 32 in the light irradiation direction of the light source part 31 in the state in which the reflection surface 52A is angled relative to the optical axis C of the reflector 32 such that it faces obliquely upward, and extends along the width of the light irradiation area W (in the direction perpendicular to the page of the drawings in FIG. 9).

The second reflection mirror 53 is positioned and arranged so that its first focal point Fm1 is at a like position relative to the reflection surface 52A as a second focal point Fr2 of the reflector 32, the mirrors 52, 53, extending along the width of the light irradiation area W (i.e., in the direction perpendicular to the page of the drawings in FIG. 9).

In this light irradiation apparatus 50, the light which has been emitted by the discharge lamp 12 by reflection by the reflector 32 is emitted via the light exit opening 32B in the direction to the first reflection mirror 52 so that the image produced on the reflection surface 32A is in the form of an ellipsoid of rotation, since the mirror 52 is between the reflector 32 and its second focal point Fr2. The image produced by the light from the reflector 32 is reflected by the first reflection mirror 52 before it is focused at the second focal point Fr2, it is then focused once at the position of the mirror image reflected by the first reflection mirror 52 at the first focal point Fm1 of the reflection surface 53A of the second reflection mirror 53 (that corresponds to the second focal point Fr2 of the reflection surface 32A of the reflector 32), it propagates again in the second reflection mirror 53.

The light incident in the second reflection mirror 53 is reflected by the cylindrical reflection surface 53A with an oval cross section, by which it propagates without focusing in the lengthwise direction of the second reflection mirror 53 (in the direction perpendicular to the page of the drawings in FIG. 9), but moreover the light is focused only in the direction which orthogonally intersects the lengthwise direction of the second reflection mirror 53 (to the right and left in FIG. 9) and then emerges via the light exit opening 11A. In this way, the light from the discharge lamp 12 is emitted such that a light irradiation region IA is formed on the light irradiation area W which is located at the second focal point Fm2 of the second reflection mirror 53 which extends linearly in the lengthwise direction of the second reflection mirror 53.

Figure 10:
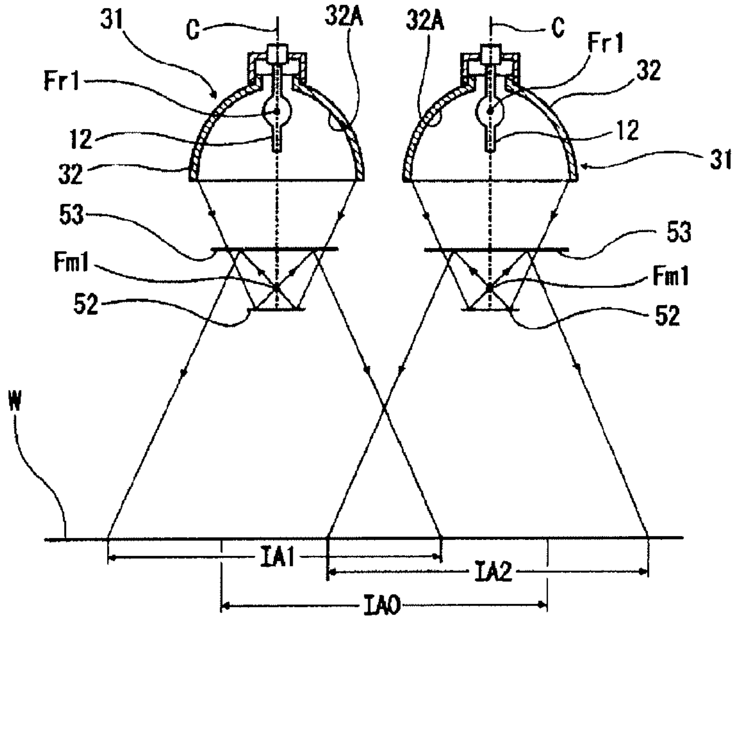
FIG. 10 is a schematic cross-sectional view of the arrangement of important parts of still another example of the third embodiment of the light irradiation apparatus in accordance with the invention.

In the light irradiation apparatus with this arrangement, as is shown for example, in FIG. 10, an arrangement formed in which, for example, two light source parts 31 are located next to one another such that the light irradiation regions IA1, IA2 produced from the respective light source parts 31 extend linearly on the light irradiation area W in the lengthwise direction of the second reflection mirrors 53 and come to partially overlap one another. This arrangement achieves the same effect as the arrangement described above with reference to FIGS. 6 & 7. In the respective light irradiation regions IA1, IA2, which extend linearly on the light irradiation area W, a state is obtained with the same irradiance as in the middle region by superimposing the peripheral regions of lower irradiance than in the middle region. Thus, in the light irradiation region, an effective region IA0 with relatively high irradiance and with a uniform distribution of the irradiance in the lengthwise direction can be set to be large so that a light irradiation region with an advantageous size can be reliably obtained. In FIG. 10, only reflection positions of the light from the light source device that are reflected by both the first reflection mirror 52 and the second reflection mirror 53 which comprise the reflection component are shown.

The light irradiation apparatus in accordance with the invention was described above. However, the light irradiation apparatus in accordance with the invention is not limited to the above described embodiments, and various changes can be made. For example, in the light irradiation apparatus according to the first embodiment, the reflection mirror can be a bucket-shaped cylindrical mirror which has a reflection surface that is arc-shaped in only a single direction. In the case of using such a reflection mirror, in practice, a sufficient action can be obtained although the focusing efficiency as a result of spherical aberration decreases a little compared to the parabolic reflection surface.

Furthermore, in the light irradiation apparatus in accordance with the invention, the reflector and the reflection mirror can be cold mirrors onto which a multilayer film has been vapor deposited with the function of transmitting light, for example, from the visible range to the IR range and the radiant heat of the lamp and reflecting only light in the UV region. In the case of this arrangement, when using the light irradiation apparatus in accordance with the invention, for example, for the inkjet printer described below using ink of the photosetting type, light from the visible range to the IR range which is contained in the radiant light of the lamp and radiant heat in the course of discharge lamp operation are prevented from being radiated onto the recording medium. Thus, the recording medium can be prevented from heating up (the temperature of the recording medium can be prevented from becoming high). This arrangement is therefore extremely useful in the case of using paper, resin, or film which can be easily deformed as the recording medium.

The discharge lamp of the short arc type is not limited to an ultra-high pressure mercury lamp, but can be, for example, a short arc discharge lamp of the metal halide type. Because such a lamp is filled, for example, with an iron (Fe) halide, the radiant efficiency of the light in the wavelength range of, for example, from roughly 350 nm to 450 nm is increased, and the total radiant flux on the light irradiation area (the article to be irradiated with light) increases. Therefore, the efficiency of the setting treatment, for example, of ink of the photosetting type, can be increased.

As was described above, the light irradiation apparatus in accordance with the invention can focus the light from the discharge lamp of the short arc type which forms a point light source in each direction onto the light irradiation surface extending linearly by the broadening of the light irradiation region on the light irradiation area according to the increase of the length of the optical path being suppressed. Therefore, the light from the discharge lamp can be used with high efficiency. Moreover, since the radiance of the discharge lamp is inherently high, in the light irradiation region formed on the surface which is to be irradiated, the distribution of the irradiance in the lengthwise direction thereof is uniform, and moreover, the effective area is formed linearly with high peak irradiance with a given size. Therefore, the light irradiation apparatus in accordance with the invention is extremely useful for use as a light source for setting of ink of the photosetting type which has been applied to a recording medium, for example, for an inkjet printer of the photosetting type (hereinafter called simply "inkjet printer").

Figure 11:
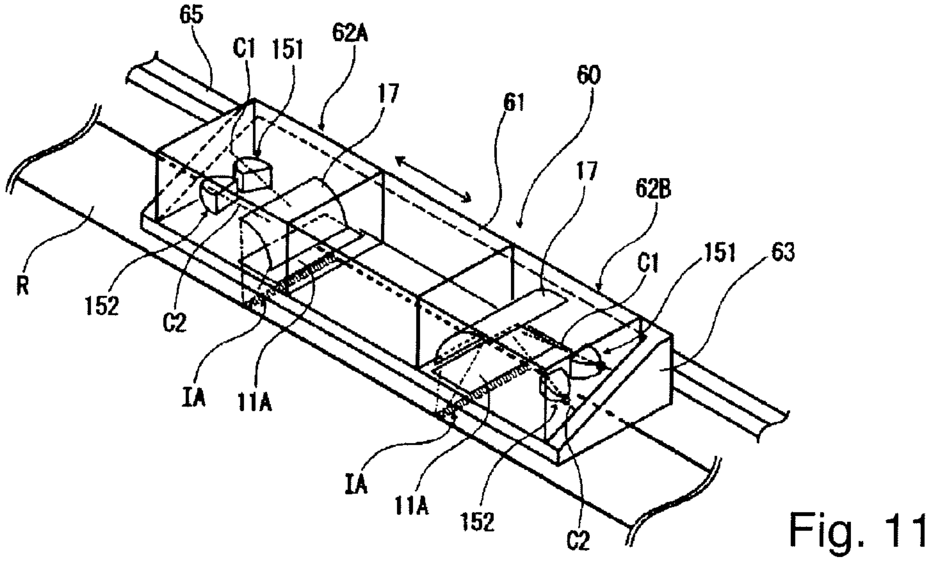
FIG. 11 is a schematic cross-sectional view of the arrangement of important parts of an example of an inkjet printer in accordance with the invention.
Figure 12:
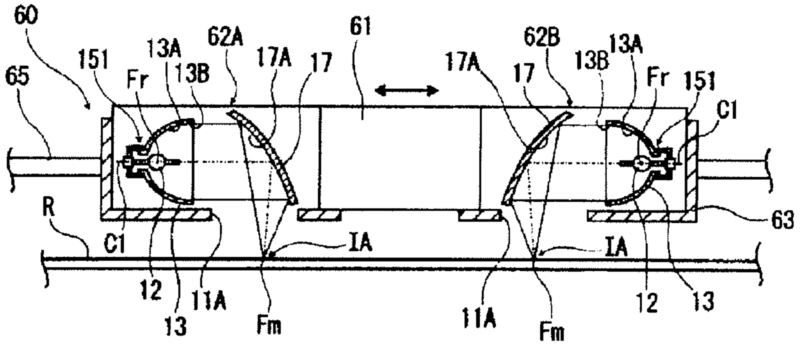
FIG. 12 is a schematic cross-sectional view of the inkjet printer shown in FIG. 11.

FIG. 11 is a schematic perspective view of the arrangement of important parts of one example of an inkjet printer in accordance with the invention. FIG. 12 is a cross section of the inkjet printer shown in FIG. 11. The inkjet printer has a write head 61 which is provided with a nozzle (not shown) which applies ink of the photosetting type, for example, ink of the UV radiation setting type, as extremely small droplets to the recording medium R, and a head part 60 in which two light irradiation apparatus 62A, 62B are installed in a carriage 63, are located, for example, on the opposite sides of the writing head 61, and set the ink by irradiating the ink which has been applied to the recording medium R with light in a given wavelength range, for example, with UV radiation.

The head part 60 is supported by a rod-like guide rail 65 which extends along the recording medium R and is moved back and forth by a drive device (not shown) along the guide rail 65 above the recording medium R.

The ink of the UV radiation setting type which is to be used can be, for example, the following and similar ones:

- ink based on radical polymerization which contains a radically polymerizable compound as a polymerizable compound; and
- ink based on cationic polymerization which contains a cationically polymerizable compound as a polymerizable compound.

For example paper, resin, film and the like can be used as the recording medium R.

The light irradiation apparatus 62A has the same arrangement as the light irradiation apparatus 40 according to the first embodiment in which there are two light source parts next to one another (see, FIGS. 6 & 7). The light source parts 151, 152 are each located next to one another in position positions angled toward each other and with the optical axes C1, C2, of light source parts 151, 152 extending in directions which cross the reflection surface 17A of the reflection mirror 17 and run parallel to the recording medium R.

The light source part 151 has a reflector 13 having a parabolic mirror with a reflection surface 13A in the form of a paraboloid of rotation with a center which is on the optical axis C1. The discharge lamp 12, in the state in which the light emitting part thereof (for example, the arc radiance spot) is positioned at the focal point Fr of the reflection surface 13A in the form of a paraboloid of rotation of the reflector 13, extends along the optical axis C1 of the reflector 13. The other light source part 152 has the same arrangement.

The reflection mirror 17 is a bucket-shaped, parabolic mirror with a reflection surface 17A which is parabolic only in a single axial direction.

The other light irradiation apparatus 62B also has the same arrangement as the light irradiation apparatus 62A except that the arrangement positions of the two light source parts 151, 152 and of the reflection mirror 17 are symmetrical to the arrangement position with respect to one light irradiation apparatus 62A.

In this inkjet printer, the head part 60, which is arranged such that the recording medium R is positioned at the focal point Fm of the reflection mirror 17 or in the vicinity thereof for the light irradiation apparatus 62A, 62B, is moved above the recording medium R, for example, in the state in which the discharge lamp 12 remains in operation. In this way, the light from the discharge lamp 12 is emitted and linearly focused with respect to the recording medium R which is located, for example, at the second focal point Fm of the reflection mirror 17 in the direction which orthogonally intersects the direction of motion of the head part 60, by which the ink of the UV radiation setting type is set directly after application to the recording medium R.

The setting treatment of the ink of the UV radiation setting type is specifically described below. In FIG. 12, the ink of the UV radiation setting type which has been applied to the recording medium R is set by the radiant light from the light irradiation apparatus 62A which is positioned upstream of the head part 60 relative to the direction of motion of the head part 60 during the printing process on the recording medium R by the head part 60 when it is moved simultaneously with the head part 60 to the right in the FIG. 12. On the other hand, the ink of the UV radiation setting type which has been applied to the recording medium R is set by the radiant light of the other light irradiation apparatus 62B which is positioned upstream of the head part 60 relative to the direction of motion of the head part 60 during the printing process on the recording medium R by simultaneous movement of the irradiation apparatus 62B with the head part 60 when it is moved to the left in FIG. 12.

In this way, since light from the discharge lamp 12 with high irradiance is radiated onto the ink of the photosetting type which has been applied to the recording medium R by the inkjet printer with the above described arrangement, the ink of the UV radiation setting type can set (photopolymerize) immediately after application to the recording medium R with high efficiency, and thus, can shorten the time which is required for setting. In this way, a change of the dot form can be prevented, and therefore, pictures with high image quality can be reliably formed.

Moreover, the arrangement in which the light from the discharge lamp 12 is reflected by the light irradiation apparatus 62A, 62B and radiated onto the recording medium R prevents the light from the IR range to the visible range which is contained in the radiant light from the discharge lamp 12 and which is unnecessary for setting of the ink of the UV radiation setting type, and the radiant heat in the course of operation of the discharge lamp 12 from being directly incident on the recording medium R. As a result, the amount of heat influence on the recording medium R can be reduced and deformation of the recording medium itself in the case of using a recording medium which can be easily deformed by heat can be reliably prevented. Thus, the choice of the recording medium R is no longer limited.

By the invention, the light irradiation apparatus (lamp housing) can be formed to be smaller and lighter than one with a discharge lamp of the long arc type. Therefore, the weight of the entire inkjet printer can be reduced, and moreover, the printing speed can be increased by increasing the efficiency of the setting treatment of the ink.

It goes without saying that, not only the light irradiation apparatus according to the above described first embodiment, but both the one according to the second embodiment and also the one according to the third embodiment can be used as the inkjet printer in accordance with the invention. The same effect as the above described effect can be obtained in an arrangement in which the light irradiation apparatus according to the second and third embodiments were used.

An inkjet printer was described above with an arrangement in which images are recorded by moving the head part with respect to the recording medium. The light irradiation apparatus in accordance with the invention can, however, also be used for an arrangement in which the position of the head part is fixed, and for example, images are recorded by intermittent transport of the recording medium.

Furthermore, the light irradiation apparatus in accordance with the invention can be used not only for a light source for setting of ink of the photosetting type which has been applied to the recording medium, for example, in an inkjet printer of the photosetting type, but also for a device for cementing panels together, in which photosetting cement which has been linearly applied between two translucent substrates is irradiated with light and cements these two translucent substrates together. In this device for cementing panels together, the length of the light irradiation region which is formed to extend linearly depending on the light irradiation apparatus can be set up according to the length of the linearly applied photosetting cement.

What we claim is:

1. Inkjet printer which comprises the following:

a write head which applies ink of the photosetting type to a recording medium; and a head part with a light irradiation apparatus which irradiates the recording medium with light for setting of the ink which has been applied thereto, wherein the write head is made to apply the above described ink to the recording medium by the head part and the recording medium being moved relative to one another, and in which by irradiation of the ink which has been applied to this recording medium with light by the light irradiation apparatus, the ink is set and pictures are recorded, wherein the above described light irradiation apparatus comprises:

a discharge lamp of the short arc type having a discharge vessel in which there is a pair of opposed electrodes; and a reflection component which reflects light from this discharge lamp, characterized in that said reflection component comprises a reflector which is arranged such that it surrounds the discharge lamp, and which reflects light from this discharge lamp through an opening of the reflector, and a reflection mirror with a cylindrical reflection surface which reflects the light reflected by this reflector and focuses it only in a single axial direction so that the light extends linearly transverse to a direction of transmission of light from the mirror and forms at least a first light irradiation region, and the relative position and orientation between the discharge lamp and the reflection component remain unchanged during lighting of the light irraditation device.

2. Inkjet printer according to claim 1, wherein said reflection component comprises a reflector which surrounds the discharge lamp and which reflects light from this discharge lamp though an opening of the reflector, wherein the reflector, assuming a three-dimensional, orthogonal coordinate system with an X axis which coincides with an optical axis of the reflector, has a reflection surface which is oval in a cross section in an X-Y plane and is parabolic in cross section in an X-Z plane.

3. Inkjet printer according to claim 1, wherein the reflector has a reflection surface in the form of a paraboloid of rotation with a center which is on an optical axis of the reflector, and wherein the reflection mirror has a reflection surface with a parabolic cross section.

4. Inkjet printer according to claim 1, wherein the reflector has a reflection surface in the form of an ellipsoid of rotation with a center which is on the optical axis of the reflector, and wherein the reflection mirror has a reflection surface with an oval cross section.

5. Inkjet printer according to claim 1, further comprising:

a second discharge lamp of the short arc type with a discharge vessel in which there is a pair of opposed electrodes; and a second reflection component which reflects light from the second discharge lamp and forms a second light irradiation region, wherein the first and second reflection components are located next to one another and are directed so that at least part of the first and second light irradiation regions produced thereby come to rest on one another in a light irradiation area formed by the combined light irradiation regions.

6. Light irradiation apparatus, comprising:

a discharge lamp of the sort arc type having a discharge vessel in which there is a pair of opposed electrodes with a distance between the electrodes of from 0.5 mm to 2.0 mm, the discharge vessel comprising mercury, the amount of mercury being in the range from 0.08 $mg/mm^3$ to 0.30 $mg/mm^3$, and a reflection component which reflects light from this discharge lamp, characterized in that said reflection component comprises a reflector which is arranged such that it surrounds the discharge lamp, and which reflects light from this discharge lamp through an opening of the reflector, and a reflection mirror with a cylindrical reflection surface which reflects the light reflected by this reflector and focuses it only in a single axial direction so that the light extends linearly transverse to a direction of transmission of light from the mirror and forms a light irradiation region, and the relative position and orientation between the discharge lamp and the reflection component remain unchanged during lighting of the light irradiation device.

7. Injet printer which comprises the following:

a write head which applies ink of the photosetting type to a recording medium; and a head part with a light irradiation apparatus which irradiates the recording medium with light for setting of the ink which has been applied thereto, wherein the write head is made arranged to apply the above described ink to the recording medium by the head part and the recording medium being moved relative to one another, and in which wherein by irradiation of the ink which has been applied to this recording medium with light by the light irradiation apparatus, the ink is set and pictures are recorded, wherein the above described light irradiation apparatus comprises:

a discharge lamp of the short arc type having a discharge vessel in which there is a pair of opposed electrodes with a distance between the electrodes of from 0.5 mm to 2.0 mm, the discharge vessel containing mercury, the amount of mercury being in the range from 0.08 $mg/mm^3$ to 0.30 $mg/mm^3$, and a reflection component which reflects light from the discharge lamp, characterized in that said reflection component comprises a reflector which is arranged such that it surrounds the discharge lamp, and which reflects light from this discharge lamp through an opening of the reflector, and a reflection mirror with a cylindrical reflection surface which reflects the light reflected by this reflector and focuses it only in a single axial direction so that the light extends linearly transverse to a direction of transmission of light from the mirror and forms a light irradiation region, and the relative position and orientation between the discharge lamp and the reflection component remain unchanged during lighting of the light irradiation device.

8. Light irradiation apparatus, comprising:

a discharge lamp of the short arc type having a discharge vessel in which there is a pair of opposed electrodes; and a reflection component which reflects light from this discharge lamp, wherein said reflection component comprises a reflector which is arranged surrounding the discharge lamp, and which reflects light from the discharge lamp through an opening of the reflector, and a reflection mirror with a cylindrical reflection surface which reflects the light reflected by the reflector and focuses it only in a single axial direction so that the light extends linearly transverse to a direction of transmission of light from the mirror and forms a light irradiation region, and the relative position and orientation between the discharge lamp and the reflection component being fixed during lighting of the light irradiation device.

9. Light irradiation apparatus in accordance with claim 8, wherein the reflector, assuming a three-dimensional, orthogonal coordinate system with an X axis which coincides with an optical axis of the reflector, has a reflection surface which is oval in a cross section in an X-Y plane and is parabolic in cross section in an X-Z plane.

10. Light irradiation apparatus in accordance with claim 8, wherein the reflector has a reflection surface in the form of a paraboloid of rotation with a center which is on an optical axis of the reflector, and wherein the reflection mirror has a reflection surface with a parabolic cross section.

11. Light irradiation apparatus in accordance with claim 8, wherein the reflector has a reflection surface in the form of an ellipsoid of rotation with a center which is on the optical axis of the reflector, and wherein the reflection mirror has a reflection surface with an oval cross section.

12. Light irradiation apparatus in accordance with claim 8, further comprising:

a second discharge lamp of the short arc type with a discharge vessel in which there is a pair of opposed electrodes; and a second reflection component which reflects light from the second discharge lamp and forms a second light irradiation region, wherein the first and second reflection components are located next to one another and are directed so that at least part of the first and second light irradiation regions produced thereby come to rest on one another in a light irradiation area formed by the combined light irradiation regions.

* * * * *